Dec. 26, 1961
P. C. GAUDILLERE
3,015,097
RADIO POSITION FINDER
Filed April 19, 1956
3 Sheets-Sheet 1
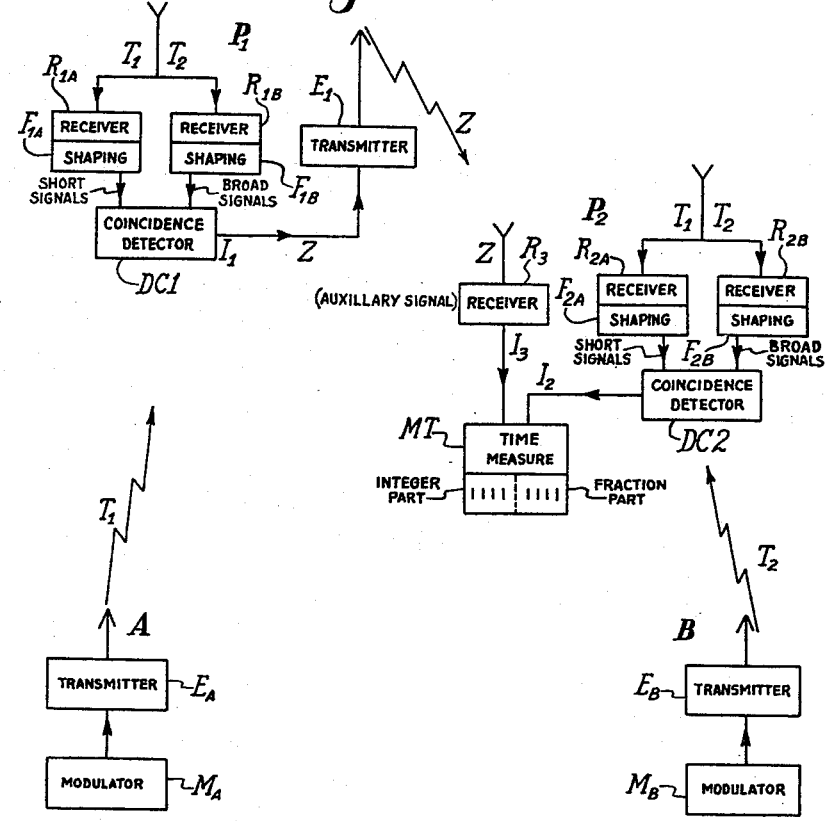
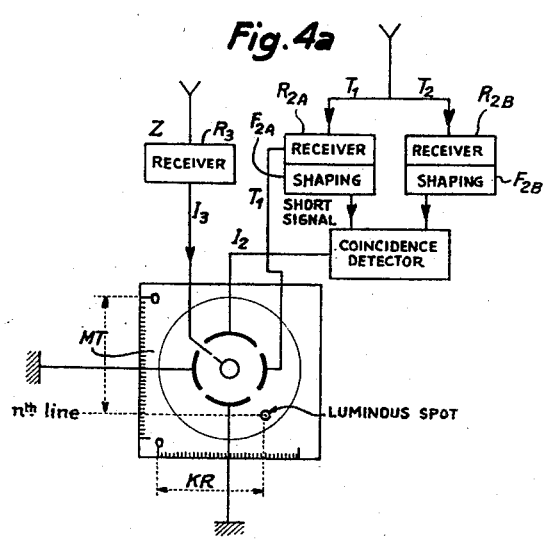
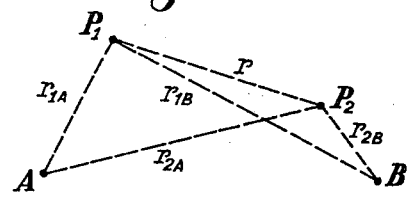
INVENTOR
Pierre Claude Gaudillere
By Diggins + Le Blanc
ATTORNEYS Dec. 26, 1961  P. C. GAUDILLERE  3,015,097
RADIO POSITION FINDER
Filed April 19, 1956  3 Sheets-Sheet 3

INVENTOR
PIERRE CLAUDE GAUDILLERE
BY Diggins & LeBlanc
ATTORNEYS

United States Patent Office 3,015,097
Patented Dec. 26, 1961

3,015,097
RADIO POSITION FINDER
Pierre Claude Gaudillere, 9 Rue Edouard Nortier,
Neuilly-sur-Seine, France
Filed Apr. 19, 1956, Ser. No. 579,388
Claims priority, application France Apr. 28, 1955
8 Claims. (Cl. 343—103)

The present invention relates to a radio method of determining the position of a mobile point.

It is known from U.S. Patent No. 2,727,231 of December 13, 1955, to provide, in a system for determining the position of a receiving point relative to spaced transmitters, at least one pair of spaced transmitters for emitting a signal from each, the signals emitted by the transmitters of each pair having different frequencies very close to one another and of such values that the velocity of propagation of the waves in kilometers per second divided by the sum of the frequencies in cycles per second is greater than the distance in kilometers between said two transmitters of each said pair, whereby an isophase line is created which constitutes the locus of the points at which said two signals are in phase and which moves from one of said transmitters to the other, only one such line existing at any given instant, phase measuring means for detecting the passage of such isophase line through a known point fixed in position, means for emitting an initial signal from a point of known position, at the moment of such passage, additional phase measuring means for detecting the passage of said isophase line through said receiving point, and time measuring means for measuring the time lag between the reception of said initial signal at said receiving point and the passage of said isophase line through said receiving point.

In other terms, it is known to determine one element of position data of a mobile point M by means of brief signals which are emitted by fixed transmitters A and B and have periods $T_1$ and $T_2$ which are different but close to each another.

It has also been proposed, in U.S. Patent No. 2,850,729 of September 2, 1958, to obtain one curvilinear co-ordinate of a mobile point by measuring the interval of time between the passages at this point of two isophases emitted by two pairs of transmitters, the second curvilinear co-ordinate of the mobile point being obtained by means of two other isophases generated by said four transmitters differently combined to form two other pairs. This method, however, also requires two interval measurements.

For this purpose a system is used comprising units situated at points A, B, M and at a fixed reference point F. The signals emitted by A and B are received in coincidence at instant $I_1$ at one of the points M and F, this point emitting at this instant $I_1$ a signal Z, and the signals emitted by A and B being received in coincidence at instant $I_2$ at the other of the two points M and F, at which point the signal Z is received at instant $I_3$ and the interval of time $i$ between instants $I_3$ and $I_2$ is measured. Determination of this interval of time permits obtaining a curvilinear coordinate of the mobile point.

The system therefore comprises, in addition to the transmitting stations A and B, an auxiliary station disposed at one of the points M and F and acting as a receiver, coincidence detector and transmitter of the signal Z, and a control or position-determining station disposed at the other of the points M and F and acting as a receiver for the signal Z, coincidence detector and time interval measurer. When the control station is situated at M, a "subjective" position determination might be said to be effected, the auxiliary station being at F; when the positions of the stations are reversed an "objective" position determination is effected.

According to this known method, the complete determination of the position of a mobile point on a surface, such as the ground surface, requires a second curvilinear co-ordinate to be obtained and in consequence the use of another pair of transmitting stations which permit defining a second series of curves of position. The complete position determination also requires a second time interval measurement $i$.

The object of the present invention is to provide a method which, by using a similar system and effecting only one time interval measurement, permits obtaining the two curvilinear co-ordinates required in the complete determination of the position of the mobile point.

In the method according to the present invention, one of the signals having periods $T_1$ and $T_2$ is utilized in the form of a short signal and the other in the form of a broad signal whose duration equals or is slightly greater than $T_1-T_2$, where $T_1$ is supposed greater than $T_2$.

According to a preferred mode of carrying out the invention the signals are emitted by A and B in any form on distinct carrier frequencies modulated at periods $T_1$ and $T_2$ and are transformed in the receivers into short and broad pulses respectively.

According to one feature of the invention, the measurement or value of the ratio $$\frac{i}{T_1}$$

provides, in respect of the point whose position is to be determined: by its integer part, a first curvilinear co-ordinate in a series of hyperbolae having foci A and B, and, by its fractional part, a second curvilinear co-ordinate in the second series of conics whose foci are A and the third fixed point.

In a first embodiment of the invention, the control station is fixed, the auxiliary station is on the mobile point, and the second series is a series of ellipses whose foci are A and the point of the auxiliary station.

The measurement of the time interval $i$ may be effected by any known method, for example by means of an electronic counter which receives pulses of frequency $$\frac{1000}{T_1}$$

or by means of a cathode-ray tube subjected to two linear sweep voltages.

Further features and advantages of the invention will be apparent from the ensuing description with reference to the accompanying drawings to which the invention is in no way limited.

In the drawings:

FIG. 1 is a diagram illustrating the principle of the invention;

FIG. 4 is a block diagram of a system according to an embodiment of the invention; and FIGURE 4a is a block diagram illustrating a portion of the system shown in FIGURE 4, according to another embodiment of the invention.

In a general way, the method of position determination of the invention may be described as follows:

(a) Two transmitters A and B are disposed at two known fixed points (FIG. 1) and emit signals whose periods $T_1$ and $T_2$ are different but near to one another.

(b) Disposed at each of two points $P_1$ and $P_2$—one of these points being fixed and of known position and the other being the point whose position is to be determined—are two receivers $R_{1A}$, $R_{1B}$ (FIG. 1A, graphs 1 and 2); and $R_{2A}$, $R_{2B}$ (FIG. 1A, graphs 4 and 5); which receive the signals from transmitters A and B and detect the instants $I_1$ (FIG. 1A, graph 3); and $I_2$ (FIG. 1A, graph 6); when these two signals reach them in coincidence.

Figure 1A:
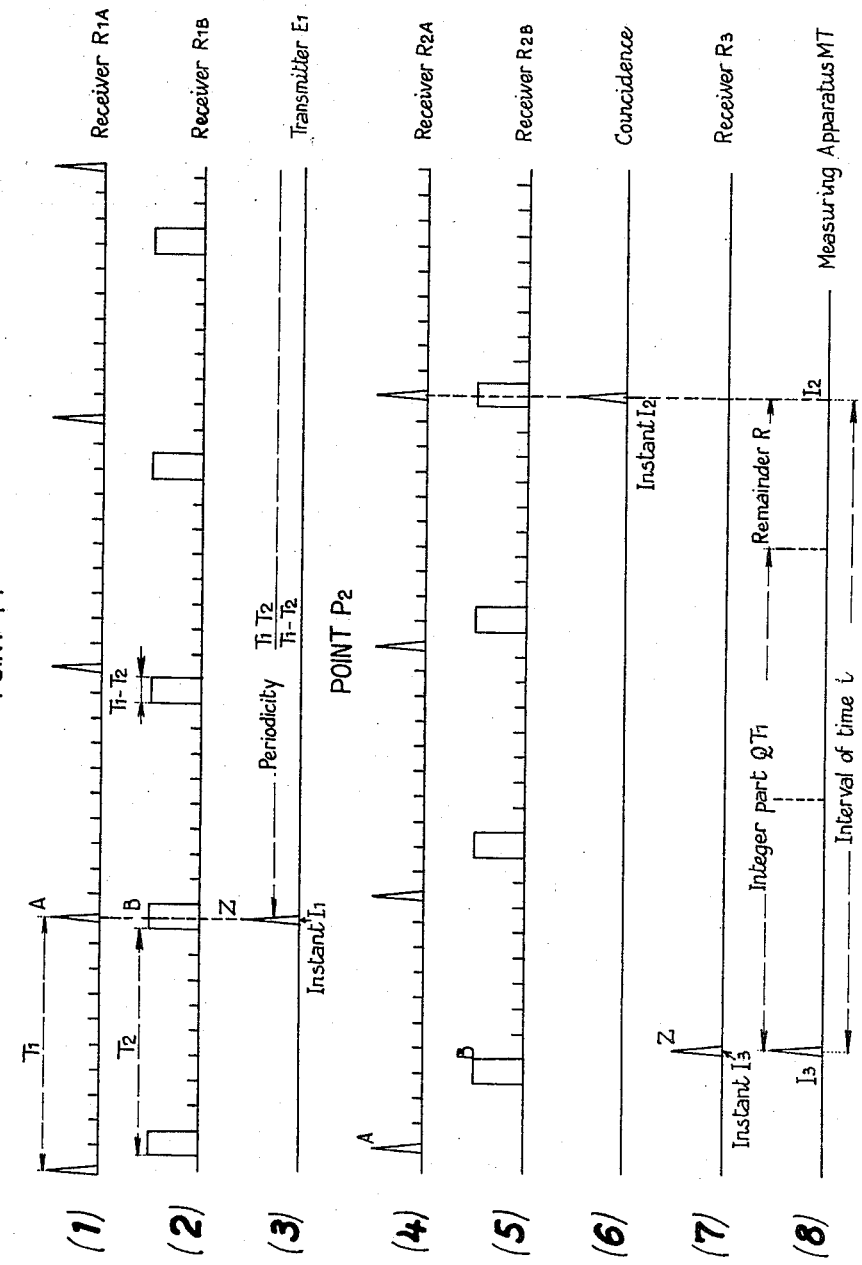
FIG. 1A is a series of graphs illustrating the operation of the system which is one object of the invention.

(c) A transmitter $E_1$ emits at point $P_1$ a signal Z at instant $I_1$ (FIG. 1A, graph 3).

(d) At point $P_2$ a receiver $R_3$ receives the signal Z (FIG. 1A, graph 7); and a measuring device measures (FIG. 1A, graph 8); the time interval $i$ between the instant $I_2$ and the instant $I_3$ of reception of the signal Z.

(e) According to the essential feature of the invention, at the instant when the signals emitted by A and B are compared for determining their coincidence, one of these signals (for example signal A) is in the form of short pulses and the other (signal B) is in the form of signals of duration equal to or slightly greater than $T_1-T_2$ (FIG. 1A, graphs 1, 2, 4, 5).

This condition may be satisfied in the following way: the signals are emitted by A and B on distinct carrier frequencies in any form modulated at periods $T_1$ and $T_2$ by any known method, for example:
Short pulse modulation.
Sinusoidal amplitude modulation.
Sinusoidal frequency modulation.
Telegraph modulaton.
Telegraph frequency shift modulation.

In this case the receivers $R_{1A}$ and $R_{2A}$ comprise circuits of conventional type receiving and detecting separately the signals of frequency $$\frac{1}{T_1}$$

and transforming or shaping them to obtain short pulses A. Likewise, the receivers $R_{1B}$ and $R_{2B}$ comprise circuits of the same kind receiving and detecting separately the signals of frequency $$\frac{1}{T_2}$$

and transforming them to obtain broad pulses B.

Assuming that $T_1$ and $T_2$ are commensurable, let it be supposed that $$\frac{T_1}{T_1-T_2}=N+1$$

wherein N is an integer.

This gives:

$$\frac{T_2}{T_1-T_2}=N$$

and the phenomenon has the periodicity:

$$T=NT_1=(N+1)T_2=\frac{T_1 T_2}{T_1-T_2}$$

It will also be assumed that there is an instant when $T_1$ and $T_2$ are emitted simultaneously at A and B; this coincidence recurs with period T. Each of these instants of coincidence is taken as zero in time. The instants of emission are therefore ($n$ being an integer number):

at A  $0, T_1, 2T_1 \ldots nT_1$  with $n<N$
at B  $0, T_2, 2T_2 \ldots nT_2$  with $n \leq N$ $T_1-T_2$ being small relative to $T_1$, the above-mentioned coincidence always occurs with sufficient approximation.

A receiver situated a distance $r_A$ from A and $r_B$ from B, receives the signals A at instants $$T_1=nT_1+\frac{r_A}{c}$$

wherein $c$ designates the speed of propagation of the electromagnetic waves; on account of the appreciable duration (equal to $T_1-T_2$) of the signals B, the same receiver receives the signals B between instants $$nT_2+\frac{r_B}{c}$$

and $$nT_2+\frac{r_B}{c}+T_1-T_2$$

A coincidence is observed for any value of $n$ satisfying the expressions:

$$nT_2+\frac{r_B}{c}<nT_1+\frac{r_A}{c}<nT_2+\frac{r_B}{c}+T_1-T_2$$

which may be written as:

$$(n-1)(T_1-T_2)<\frac{r_B-r_A}{c}<n(T_1-T_2)$$

Hyperbolae defined by $r_B-r_A=nc(T_1-T_2)$ are constructed for all the integer values of $n$ (positive and negative between $$-\frac{AB}{c(T_1-T_2)} \text{ and } +\frac{AB}{c(T_1-T_2)})$$

Hereinafter, the term "channel" is used for the area comprised between two consecutive hyperbolae, i.e. two hyperbolae corresponding to two consecutive values of $n$; the area between the two hyperbolae corresponding to $n-1$ and $n$ is called the $n$th channel.

$$T_1>\frac{r_A}{c}$$

has been chosen for the maximum value of $r_A$ in the area to be covered.

All receivers placed in the $n$th channel detect the coincidence between the instants $nT_1$ and $(n+1)T_1$.

If the point $P_1$ is in the $n$th channel at a distance $r_{1A}$ from A and if the point $P_2$ is in the $n'$th channel at a distance $r_{2A}$ from A and at a distance $r$ from $P_1$, the transmitter $E_1$ situated at $P_1$ emits the signal Z at instant $$I_1=nT_1+\frac{r_{1A}}{c}$$

This signal is received at $P_2$ at instant $$I_3=nT_1+\frac{r_{1A}+r}{c}$$

Coincidence occurs at $P_2$ at instant $$I_2=n'T_1+\frac{r_{2A}}{c}$$

The interval of time between the instant $I_2$ of coincidence and the instant $I_3$ of reception of the signal Z is measured at $P_2$.

$$i=(n-n')T_1+\frac{r_{1A}-r_{2A}+r}{c}$$

$T_1$ has been chosen greater than the maximum of $$\frac{r_{1A}-r_{2A}+r}{c}$$

in the entire area to be covered.

The value $i$ provides:

(1) The value of $Q=n-n'$ where Q is the integer part of the quotient of $i$ divided by $T_1$. This value permits locating the point of unknown position in one of the channels constituted by the above-mentioned series of hyperbolae.

(2) The value of $$R=\frac{r_{1A}-r_{2A}+r}{c}, \frac{R}{T_1}$$

being the fractional part of the above-mentioned-quotient. This value permits locating the point in question in a channel of a second series of curves, as will be explained hereinbelow.

A single measurement of an interval of time therefore permits determining the position of a point on a surface.

This process may be used for effecting an objective position determination or a subjective position determination.

OBJECTIVE POSITION DETERMINATION $P_1$ being considered as the point whose position is to be determined and $P_2$ the fixed point of known position, the system comprises (FIG. 4) the transmitting station A having a modulator $M_A$ of period $T_1$ and a transmitter $E_A$ of signals A, and the transmitting station B having a modulator $M_B$ of period $T_2$ and a transmitter $E_B$ of signals B.

The system further comprises:

(1) The auxiliary station which is disposed at the mobile point $P_1$ and comprises: a receiving station $R_{1A}$ receiving signals emitted by A; a shaping device $F_{1A}$ transforming the signals into short signals A; a receiving station $R_{1B}$ receiving the signals emitted by B; a shaping device $F_{1B}$ transforming these signals into broad signals B; a coincidence detector $DC_1$ comprising a coincidence tube whose grids receive the signals A and B and whose plate generates at instant $i_1$ of coincidence the signal Z; a transmitter $E_1$ emitting this signal Z.

(2) The control station which is disposed at the fixed point $P_2$ and which comprises: a receiving station $R_{2A}$ receiving the signals emitted by A; a shaping device $F_{2A}$ transforming these signals into short signals A; a receiving station $R_{2B}$ receiving the signals emitted by B; a shaping device $F_{2B}$ transforming these signals into broad signals B; a coincidence detector $DC_2$ similar to the device $DC_1$ and detecting the coincidence $I_2$; a receiving station $R_3$ receiving the signal Z at instant $I_3$; a time measuring apparatus MT measuring the time interval $i$ between $I_2$ and $I_3$.

It has been seen that $i$ is equal to $$(n-n')\, T_1 + \frac{r_{1A}-r_{2A}+r}{c}$$

In the present case, the values $r_{1A}=AP_1$ and $n$ (number of the channel pertaining to $P_1$) are unknown; the values $r_{2A}=AP_2$ and $n'$ (number of the channel pertaining to $P_2$) are known; the value $r=P_1P_2$ is unknown.

Figure 2:
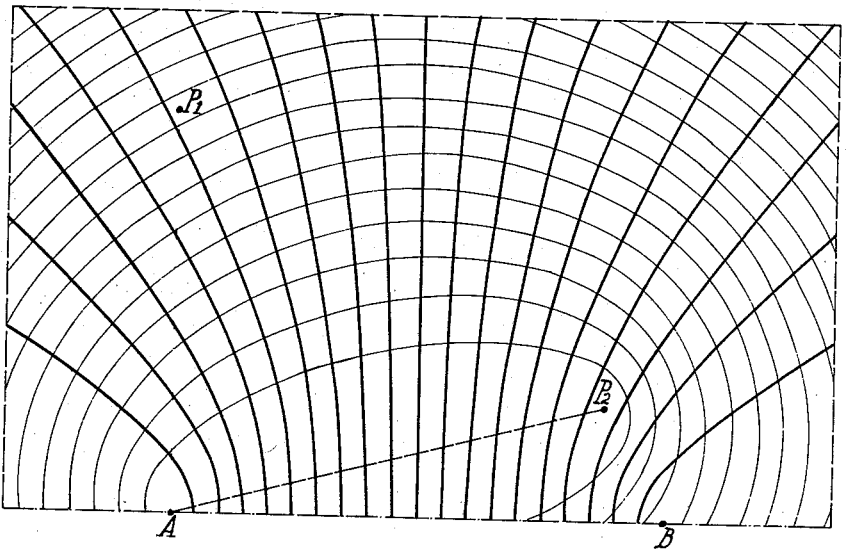
FIG. 2 is a diagram relating to objective position determination.

The value of $Q=n-n'$ where Q is the integer part of the quotient of $i$ divided by $T_1$ provides the value of $n$ and thus permits determining for the point $P_1$ the number of the channel in the series of hyperbolae having foci A, B (see FIG. 2).

The value of $$R=\frac{r_{1A}-r_{2A}+r}{c},\ \frac{R}{T_1}$$

being the fractional part of the above-mentioned quotient, defines an ellipse whose equation may be written $$r_{1A}+r=cR+r_{2A}$$

which shows that the foci are A and $P_2$.

The geographic position of $P_1$ is thus completely defined by the single measurement of $i$ which provides the parameter of the hyperbola and the parameter of the ellipse.

$i$ may be measured notably by one of the following devices:

(1) Electronic counter

As shown diagrammatically in FIGURE 4, the time measuring apparatus MT may consist of an electronic counter counting in tens of conventional type, which receives the pulses supplied by a local oscillator of frequency $$\frac{1000}{T_1}$$

for example. The counting is started by the signal $I_2$ and stopped by the signal $I_3$; the result is then indicated by the lighting up of neon tubes. The following signal $I_2$ re-sets the counter to zero and the counting recommences. The number of thousands indicates the value of Q, whence $n$, the number formed by the figures of the hundreds, tens and units indicates the value of R. The hyperbolae $Q=$constant and the ellipses $R=$constant may be traced on a map of the zone under observation, which permits plotting the position.

(2) Cathode-ray tube

As shown diagrammatically in FIGURE 4a the time measuring apparatus MT may consist of a cathode-ray tube is subjected to two linear sweep voltages in a similar manner to a television screen tube. The sweeping of the image is started by the signal $I_2$ and the line sweeping is started by the signals A received at the control station $P_2$. The signal Z received from the mobile point renders the spot luminous. Thus a mobile point situated in the $n$th channel causes a luminous spot to appear on the $n$th line of the screen at a distance KR from the origin of this line, K being a constant.

It is possible, therefore, to determine simultaneously the position of several mobile points. It is furthermore possible to replace the linear sweeping of the television type by non-linear sweeping so that the position of the luminous points appears on a map which is superimposed on the screen and is devoid of excessive deformation.

The above-described device generally gives for any measurement of $i$ two positions of the mobile point since the ellipse intersects a hyperbolic channel at two points. This ambiguity is easily settled in most problems of teleguiding where the approximate position of the mobile point is known. It is generally known on which side of the straight line AB the mobile point is situated and advantageously the station $P_2$ is disposed in the region of this line, the two points of intersection being then symmetrical relative to AB. If the point $P_2$ is situated in the region of A, the ellipses become circles and a direct measure of the distance is obtained. If the point $P_2$ is situated in the region of B, the ellipses and the hyperbolae have common foci and intersect one another at right angles; this device is of particular advantage as concerns the precision of the position determination.

SUBJECTIVE POSITION DETERMINATION

In this case it is $P_2$ which is the mobile point whose position is to be determined; the auxiliary station is, then, disposed at the fixed point $P_1$ and the control station at the mobile point $P_2$. In other words, with this arrangement the disposition of the various units of the system at A, B, $P_1$ and $P_2$ is identical to that described in respect of objective position determination. In this case in the formula:

$$i=(n-n')\, T_1 + \frac{r_{1A}-r_{2A}+r}{c}$$

the values $r_{1A}=AP_1$ and $n$ (number of the channel pertaining to $P_1$) are known, the values $r_{2A}=AP_2$ and $n'$ (number of the channel pertaining to $P_2$) are unknown, and the value $r=P_1P_2$ is unknown.

Figure 3:
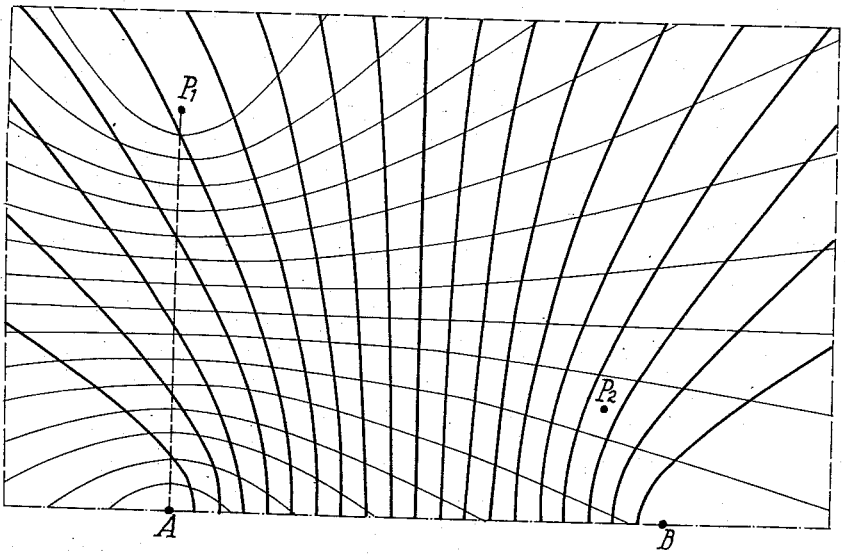
FIG. 3 is a diagram relating to subjective position determination.

The value $Q=n-n'$, where Q is the integer part of the quotient of $i$ divided by $T_1$, provides the value $n'$ and therefore permits determining for $P_2$ the number of the channel in the series of hyperbolae having foci A, B (FIG. 3).

The value $$R=\frac{r_{1A}-r_{2A}+r}{c},\ \frac{R}{T_1}$$

being the functional part of the above-mentioned quotient, defines a hyperbola whose equation may be written:

$$r-r_{2A}=cR-r_{1A}$$

which shows that the foci are A and $P_1$.

The geographic position of $P_2$ is thus completely defined by the simple measurement of $i$ which provides the parameter of the hyperbola having foci A, B and the parameter of the hyperbola having foci A, $P_1$.

The position data thus obtained depends on the position of the auxiliary station $P_1$; if it is desired to obtain the position of the mobile point by two co-ordinates, the transmitter $P_1$ must be placed at such position that the second hyperbolae intersect the first at angles as near as possible to right angles throughout the area under consideration. This is obtained by disposing the vectors AB and $AP_1$ in such manner that they make between themselves a straight angle or obtuse angle bounding this zone. In this arrangement the same methods as those described for the first arrangement may be used for measuring $i$.

The diagram of the system shown in FIG. 4 is valid for both cases of objective and subjective position determination with the sole difference that in the first case $P_1$ is mobile and of unknown position and $P_2$ fixed and of known position, whereas in the second case the situation is reversed.

According to one modification of the invention, in the case of objective position determination the signal Z emitted by the mobile point may be formed by a combination of signals in accordance with a predetermined code which permits providing certain information such as the identity of the mobile point or its altitude if it concerns an aerial mobile object. In the latter case, for example, the signal Z could be followed by another signal Z', the time interval between these two signals being set by a barometric altimeter. The measurement of this time interval at the station $P_2$ gives the altitude of the mobile point.

Although specific embodiments of the invention have been hereinabove described, many modifications and changes may be made therein without departing from the scope of the invention as defined in the appended claims.

Having now described my invention what I claim as new and desire to secure by Letters Patent is:

1. Radio method of determining the position of a mobile point relative to spaced transmitters, comprising the following steps: emitting from two fixed spaced transmitters A and B signals having periods $T_1$ and $T_2$ respectively which are different but close to one another, said signals being of any shape and being carried by carrier waves of different frequencies modulated at periods $T_1$ and $T_2$; receiving said signals at a fixed point and at the mobile point whose position is to be determined; at each of said points, transforming one of said signals into a short signal and the other signal into a broad signal whose duration is equal to or slightly greater than $T_1-T_2$ and determining the instant of coincidence of these two transformed signals; emitting an auxiliary signal at the instant of coincidence at one of said points from an auxiliary station located at this point; receiving said auxiliary signal at a control station located at the other of said points; measuring at said control station the time interval $i$ between the instant when the two signals are in coincidence at said control station and the instant of reception of said auxiliary signal at said control station; computing the integer part of the quotient $$\frac{i}{T_1}$$

to obtain a first curvilinear coordinate of said mobile point in a series of hyperbolae whose foci are A and B, and computing the fraction part of said quotient $$\frac{i}{T_1}$$

to obtain a second curvilinear co-ordinate of said mobile point in a series of conics whose foci are A and said fixed point.

2. Radio method of determining the position of a mobile point relative to spaced transmitters, comprising the following steps: emitting from two fixed spaced transmitters A and B signals having periods $T_1$ and $T_2$ respectively which are different but close to one another, said signals being of any shape and being carried by carrier waves having different frequencies modulated at periods $T_1$ and $T_2$; receiving said signals at a fixed point and at the mobile point whose position is to be determined; at each of said points, transforming one of said signals into a short signal and the other signal into a broad signal whose duration is equal to or slightly greater than $T_1-T_2$ and determining the instant of coincidence of these two transformed signals; emitting an auxiliary signal at the instant of coincidence at said mobile point from an auxiliary station located at said mobile point; receiving said auxiliary signal at a control station located at the fixed point; measuring at said control station the time interval $i$ between the instant when the two signals are in coincidence at said control station and the instant of reception at said control station of said auxiliary signal; computing the integer part of the quotient $$\frac{i}{T_1}$$

to obtain a first curvilinear co-ordinate of said mobile point in a series of hyperbolae whose foci are at A and B, and computing the fraction part of said quotient $$\frac{i}{T_1}$$

to obtain a second curvilinear co-ordinate of said mobile point in a series of ellipses whose foci are at A and said fixed point.

3. Radio method of determining the position of a mobile point relative to spaced transmitters, comprising the following steps: emitting from two fixed spaced transmitters A and B signals having periods $T_1$ and $T_2$ respectively which are different but close to one another, said signals being of any shape and being carried by carrier waves having different frequencies modulated at periods $T_1$ and $T_2$; receiving said signals at a fixed point and at the mobile point whose position is to be determined; at each of said points, transforming one of said signals into a short signal and the other signal into a broad signal whose duration is equal to or slightly greater than $T_1-T_2$ and determining the instant of coincidence of these two transformed signals; emitting an auxiliary signal at the instant of coincidence at said fixed point from an auxiliary station located at said fixed point; receiving said auxiliary signal at a control station located at said mobile point; measuring at said control station the time interval $i$ between the instant when the two signals are in coincidence at said control station and the instant of reception at said control station of said auxiliary signal; computing the integer part of the quotient $$\frac{i}{T_1}$$

to obtain a first curvilinear co-ordinate of said mobile point in a series of hyperbolae whose foci are at A and B, and computing the fractional part of said quotient $$\frac{i}{T_1}$$

to obtain a second curvilinear co-ordinate of said mobile point in a second series of hyperbolae whose foci are at A and said fixed point.

4. In an installation for the radio determination of the position of a mobile point relative to spaced transmitters; two fixed spaced transmitters A and B emitting respectively signals having periods $T_1$ and $T_2$ respectively which are different but close to one another; an auxiliary receiver-transmitter located at a first point; in said auxiliary receiver-transmitter, means for receiving said signals having periods $T_1$ and $T_2$, means for transforming said signals into short signals and broad signals respectively, the latter signals having a duration equal to or slightly greater than $T_1-T_2$, means for determining the instant of coincidence of these two transformed signals, and means for emitting an auxiliary signal at this instant; a control station located at a second point, said mobile point being one of said first and second points; at said control station, means for receiving said signals having periods $T_1$ and $T_2$ and said auxiliary signal, means for transforming said signals having periods $T_1$ and $T_2$ into short signals and broad signals respectively, the latter signals having a duration equal to or slightly greater than $T_1-T_2$, and means for measuring the integer part and means for measuring the fraction part of the quotient $$\frac{i}{T_1}$$

$i$ being the time interval between the instant when said auxiliary signal is received at said control station and the instant of coincidence at said control station of said two signals having periods $T_1$ and $T_2$.

5. In an installation for the radio determination of the position of a mobile point relative to spaced transmitters; two fixed spaced transmitters A and B for emitting respectively signals having periods $T_1$ and $T_2$ which are different but close to one another; an auxiliary receiver-transmitter located at said mobile point; in said receiver-transmitter, means for receiving said signals having periods $T_1$ and $T_2$, means for transforming said signals into short signals and broad signals respectively, the latter signals having a duration equal to or slightly greater than $T_1-T_2$, means for determining the instant of coincidence of these two transformed signals and means for emitting at this instant an auxiliary signal; a control station located at a fixed point; at said control station, means for receiving said signals having periods $T_1$ and $T_2$ and said auxiliary signal, means for transforming the signals having periods $T_1$ and $T_2$ into short signals and broad signals respectively, the latter signals having a duration equal to or slightly greater than $T_1-T_2$; and means for measuring the integer part and means for measuring the fraction part of the quotient $$\frac{i}{T_1}$$

$i$ being the time interval between the instant when said auxiliary signal is received at said control station and the instant of coincidence of the transformed signals having periods $T_1$ and $T_2$ at said control station.

6. In an installation for the radio determination of the position of a mobile point relative to spaced transmitters; two spaced transmitters A and B for emitting respectively signals having periods $T_1$ and $T_2$ which are different but close to one another; an auxiliary receiver-transmitter located at a fixed point; in said receiver-transmitter, means for receiving said signals having periods $T_1$ and $T_2$, means for transforming said signals into short signals and broad signals respectively, the latter signals having a duration equal to or slightly greater than $T_1-T_2$, means for determining the instant of coincidence of these two transformed signals and means for emitting at this instant an auxiliary signal; a control station located at said mobile point; at said control station, means for receiving said signals having periods $T_1$ and $T_2$ and said auxiliary signals, means for transforming the signals having periods $T_1$ and $T_2$ into short signals and broad signals respectively, the latter signals having a duration equal to or slightly greater than $T_1-T_2$, and means for measuring the integer part and means for measuring the fraction part of the quotient $$\frac{i}{T_1}$$

$i$ being the time interval between the instant when said auxiliary signal is received at said control station and the instant of coincidence of the transformed signals having periods $T_1$ and $T_2$ at said control station.

7. Installation as claimed in claim 4, wherein said measuring means comprise an electronic counter fed at a frequency $$\frac{10^n}{T_1}$$

$n$ being an integer, the counting of which is started by the reception in coincidence of said signals having periods $T_1$ and $T_2$ and stopped by the reception of said auxiliary signal.

8. Installation as claimed in claim 4, wherein said measuring means comprise a cathode-ray tube subjected to two linear sweep voltages the field sweep being controlled by the reception in coincidence of the signals having periods $T_1$ and $T_2$ at the control station, the line sweep being controlled by the reception at the control station of the signals emitted by the transmitter A, and the brightness of the spot being controlled by the reception of said auxiliary signal.

References Cited in the file of this patent

UNITED STATES PATENTS

| | | |
|---|---|---|
| 2,148,267 | Honore | Feb. 21, 1939 |
| 2,487,822 | McLamore | Nov. 15, 1949 |
| 2,513,321 | Hawkins | July 4, 1950 |
| 2,513,322 | Hawkins | July 4, 1950 |